(12) United States Patent
Ullah et al.

(10) Patent No.: US 12,149,638 B2
(45) Date of Patent: Nov. 19, 2024

(54) CERTIFICATE REVOCATION CHECK

(71) Applicant: TELEFONAKTIEBOLAGET LM ERICSSON (PUBL), Stockholm (SE)

(72) Inventors: Kazi Wali Ullah, Espoo (FI); Patrik Salmela, Espoo (FI); Abu Shohel Ahmed, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 17/623,786

(22) PCT Filed: Jul. 1, 2019

(86) PCT No.: PCT/EP2019/067551
§ 371 (c)(1),
(2) Date: Dec. 29, 2021

(87) PCT Pub. No.: WO2021/001009
PCT Pub. Date: Jan. 7, 2021

(65) Prior Publication Data
US 2022/0247580 A1    Aug. 4, 2022

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01); *H04L 9/3247* (2013.01); *H04L 2209/80* (2013.01)

(58) Field of Classification Search
CPC ..... H04L 9/3268; H04L 9/321; H04L 9/3247; H04L 63/0263; H04L 63/20; H04L 63/166

USPC .......................................................... 713/156
See application file for complete search history.

(56) References Cited

U.S. PATENT DOCUMENTS

| | | | |
|---|---|---|---|
| 8,533,463 B2 * | 9/2013 | Parkinson | H04L 63/20 713/157 |
| 8,583,917 B2 * | 11/2013 | Parkinson | H04L 63/10 380/282 |
| 11,184,178 B2 * | 11/2021 | Russell | H04L 63/108 |

(Continued)

FOREIGN PATENT DOCUMENTS

| WO | 2019105558 A1 | 6/2019 |
|---|---|---|
| WO | WO 2019/105558 * | 6/2019 |

OTHER PUBLICATIONS

GSM Association, "GSMA eUICC PKI Certificate Policy, version 1.1", Official Document SGP .14, Apr. 27, 2017.

(Continued)

*Primary Examiner* — Longbit Chai
(74) *Attorney, Agent, or Firm* — Sage Patent Group (57) ABSTRACT

There is provided mechanisms for certificate revocation check during a subscription related procedure for a subscriber entity. A method is performed by the subscriber entity. The method comprises receiving a message from a subscription management entity during the subscription related procedure for the subscriber entity. The message comprises a certificate and an OCSP response for the certificate. The OCSP response indicates a revocation state of the certificate. The method comprises determining whether the certificate has been revoked or not by checking the revocation state as indicated in the OCSP response.

19 Claims, 6 Drawing Sheets

(56) References Cited

U.S. PATENT DOCUMENTS

2004/0168055 A1　8/2004　Lord et al.
2005/0138365 A1　6/2005　Bellipady et al.

OTHER PUBLICATIONS

GSM Association, "RSP Technical Specification, version 2.2.1", Official Document SGP .22-RSP Technical Specification, Dec. 18, 2018.

Santesson et al., "X.509 Internet Public Key Infrastructure Online Certificate Status Protocol—OCSP", Internet Engineering Task Force (IETF), Jun. 2013.

\* cited by examiner

CERTIFICATE REVOCATION CHECK

RELATED APPLICATIONS

This application is a national stage application of International Patent Application No. PCT/EP2019/067551, filed Jul. 1, 2019, the disclosure of which is hereby incorporated herein by reference in its entirety.

TECHNICAL FIELD

Embodiments presented herein relate to a method, a subscriber entity, a computer program, and a computer program product for certificate revocation check during a subscription related procedure for a subscriber entity. Embodiments presented herein further relate to a method, a subscription management entity 30, a computer program, and a computer program product for facilitating certificate revocation check during the subscription related procedure for the subscriber entity.

BACKGROUND

Remote SIM provisioning (RSP; where SIM is short for subscriber identity module) for consumer devices is described in "SGP.22—RSP Technical Specification", Version 2.2.1, 18 Dec. 2018, published by the GSM Association. According to this document, the subscriber entity first makes a contract with a mobile network operator (MNO). Secondly, optionally, the subscriber entity requests profile download from the MNO. Thirdly, the subscriber entity downloads a subscription profile from a server (enhanced Subscription Manager Data Preparation (SM-DP+) server) to the embedded universal integrated circuit card (eUICC) in the communication device to be provisioned. Section 3.1 of the aforementioned document describes the profile download initiation process. It indicates how the user orders a subscription from the MNO. Request/response methods are used for the MNO to request the SM-DP+ to generate a SIM profile. After profile generation, the subscriber entity can download the generated profile by contacting the SM-DP+ using the communication device. The communication device is assumed to comprise a local profile assistant (LPA) and the eUICC. The LPA acts as a proxy between the SM-DP+ and the eUICC during profile download.

To support such an RSP system using a public key infrastructure (PKI), a certificate issuer (CI) in the RSP system issues needed certificates and acts as root of trust for authentication of the entities in the system. The system support X.509 certificates using the international X.509 PKI. Before a trust can be established for a particular certificate, the certificate needs to be verified. Section 4.5.2.2 of the aforementioned document lists what actions need to be performed to validate a certificate. These actions are summarized next. Every certificate shall have a valid signature. Every certificate shall be signed by a GSMA CI, or a trusted chain up to a GSMA CI. Certificate path validation shall follow the process defined in RFC 5280, using the Subject Key Identifier and Authority Key Identifier fields. As a consequence, Certificates shall have the 'Subject Key Identifier' and 'Authority Key Identifier' extensions set, except the GSMA CI certificate that shall only have the 'Subject Key Identifier' extensions set. Each certificate shall not have been revoked, and no certificate in the trust chain should have been revoked. Each certificate shall not have expired. Each certificate shall have all the critical extensions defined for its profile.

However, it is not disclosed how these actions are to be performed.

Hence, there is still a need for improved remote SIM provisioning of subscriber entities.

SUMMARY

An object of embodiments herein is to provide efficient certificate revocation check during a subscription related procedure for a subscriber entity.

According to a first aspect there is presented a method for certificate revocation check during a subscription related procedure for a subscriber entity. The method is performed by the subscriber entity. The method comprises receiving a message from a subscription management entity during the subscription related procedure for the subscriber entity. The message comprises a certificate and an online certificate status protocol (OCSP) response for the certificate. The OCSP response indicates a revocation state of the certificate. The method comprises determining whether the certificate has been revoked or not by checking the revocation state as indicated in the OCSP response.

According to a second aspect there is presented a subscriber entity for certificate revocation check during a subscription related procedure for the subscriber entity. The subscriber entity comprises processing circuitry. The processing circuitry is configured to cause the subscriber entity to receive a message from a subscription management entity during the subscription related procedure for the subscriber entity. The message comprises a certificate and an OCSP response for the certificate. The OCSP response indicates a revocation state of the certificate. The processing circuitry is configured to cause the subscriber entity to determine whether the certificate has been revoked or not by checking the revocation state as indicated in the OCSP response.

According to a third aspect there is presented a subscriber entity for certificate revocation check during a subscription related procedure for the subscriber entity. The subscriber entity comprises a receive module configured to receive a message from a subscription management entity during the subscription related procedure for the subscriber entity. The message comprises a certificate and an OCSP response for the certificate. The OCSP response indicates a revocation state of the certificate. The subscriber entity comprises a determine module configured to determine whether the certificate has been revoked or not by checking the revocation state as indicated in the OCSP response.

According to a fourth aspect there is presented a computer program for certificate revocation check during a subscription related procedure for a subscriber entity. The computer program comprises computer program code which, when run on processing circuitry of a subscriber entity, causes the subscriber entity to perform a method according to the first aspect.

According to a fifth aspect there is presented a method for facilitating certificate revocation check during a subscription related procedure for a subscriber entity. The method is performed by a subscription management entity. The method comprises sending a message towards the subscriber entity during the subscription related procedure for the subscriber entity. The message comprises a certificate and an OCSP response for the certificate. The OCSP response indicates a revocation state of the certificate.

According to a sixth aspect there is presented a subscription management entity for facilitating certificate revocation check during a subscription related procedure for a subscriber entity. The subscription management entity comprises processing circuitry. The processing circuitry is configured to cause the subscription management entity to send a message towards the subscriber entity during the subscription related procedure for the subscriber entity. The message comprises a certificate and an OCSP response for the certificate. The OCSP response indicates a revocation state of the certificate.

According to a seventh aspect there is presented a subscription management entity for facilitating certificate revocation check during a subscription related procedure for a subscriber entity. The subscription management entity comprises a send module configured to send a message towards the subscriber entity during the subscription related procedure for the subscriber entity. The message comprises a certificate and an OCSP response for the certificate. The OCSP response indicates a revocation state of the certificate.

According to an eight aspect there is presented a computer program for facilitating certificate revocation check during a subscription related procedure for a subscriber entity, the computer program comprising computer program code which, when run on processing circuitry of a management entity 300, causes the subscription management entity 300 to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these subscriber entities, these subscription management entities, and these computer programs provide efficient remote SIM provisioning of the subscriber entities Advantageously these methods, these subscriber entities, these subscription management entities, and these computer programs provide a practical approach to handle the certificate revocation by the subscriber entity.

Advantageously these methods, these subscriber entities, these subscription management entities, and these computer programs put less constraint by requiring less external communication on the subscriber entity, which is beneficial for constrained subscriber entities.

Advantageously these methods, these subscriber entities, these subscription management entities, and these computer programs put less burden on the memory requirement for the subscriber entity as now the subscriber entity do not have to store a whole certificate revocation list.

Advantageously these methods, these subscriber entities, these subscription management entities, and these computer programs enable the overall certificate verification process by the subscriber entity to be faster and lessens the computational processing needed to be performed by the subscriber entity.

Advantageously these methods, these subscriber entities, these subscription management entities, and these computer programs enable a simple design of the subscriber entity.

Advantageously these methods, these subscriber entities, these subscription management entities, and these computer programs enable the power consumption in the subscriber entity to be reduced as the subscriber entity no longer has to maintain a certificate revocation list and it does not have to do the certificate revocation status check by making any external connection, which uses significant power for a constrained subscriber entity.

Advantageously these methods, these subscriber entities, these subscription management entities, and these computer programs remove any hard dependency between the subscriber entity and the CA server for certificate validation.

Advantageously these methods, these subscriber entities, these subscription management entities, and these computer programs will decrease the load to an OCSP server as now the queries will be made from the subscription management entities and not from the subscriber entities (which there typically will be many more of).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
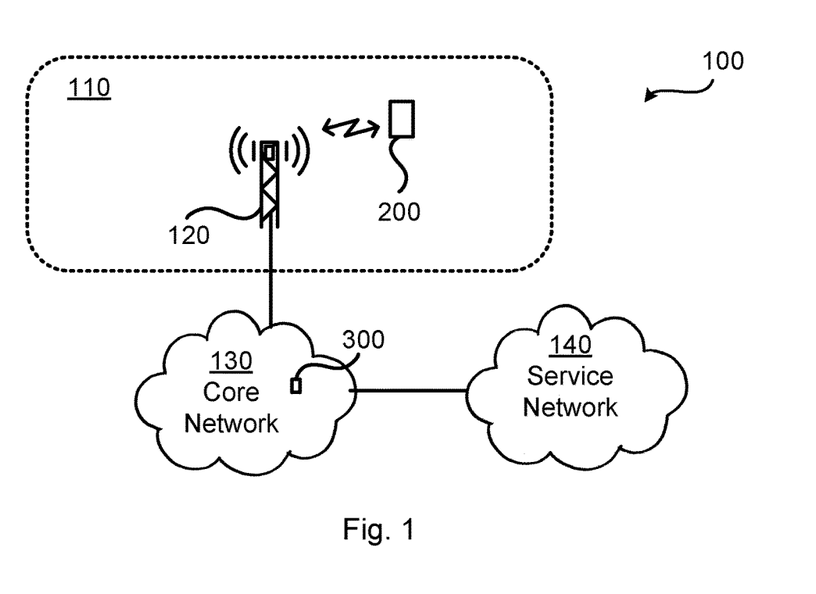
FIG. 1 is a schematic diagram illustrating a communication network according to embodiments.

FIG. 1 is a schematic diagram illustrating a communication network 100 where embodiments presented herein can be applied. The communication network 100 comprises a radio access network 110, a core network 130 and a service network 140. In turn, the radio access network 110 comprises a radio access network node 120 and the core network 130 comprises a core network node in the form of a subscription management entity 300. The radio access network node 120 is configured to provide network access to, and thus to serve, a subscriber entity 200. As the skilled person understands, the radio access network 110 as well as the core network 130 might comprise a plurality of functions, nodes, devices, and entities for facilitating communication between the subscriber entity 200 and the service network 140.

In some examples the subscriber entity 200 is an eUICC. The eUICC might be part of a terminal device, such as a user equipment (UE), network equipped vehicle, network equipped sensor, or a so-called Internet of Things (IoT) device.

In some examples the subscription management entity 300 is a Subscription Manager Data Preparation (SM-DP) entity, an enhanced Subscription Manager Data Preparation (SM-DP+) entity, a Subscription Manager Discovery Server (SM-DS), or a Subscription Manager Secure Routing (SM-SR) entity.

As noted above, there is still a need for improved remote SIM provisioning of subscriber entities.

In more detail, the RSP architecture trust model as described in the aforementioned document entitled "SGP.22—RSP Technical Specification" is solely based on the PKI where root of trust begins with a known CI. This CI signs the certificate for other entities in the RSP model, e.g. SM-DP+, Subscription Manager Discovery Server (SM-DS), the eUICC manufacturer (EUM), etc. The eUICC (as represented by the subscriber entity 200) can verify the certificate of these entities as it has the public key/certificate of the CI. Now, verifying these certificates by the subscriber entity 200 also should include a checking whether a certificate is revoked or not. How to perform such checking, or to handle certificate revocations, is not disclosed in the aforementioned document.

While it could be possible to keep track of revoked certificates in a certificate revocation list (CRL), this poses several issues to a subscriber entity 200. First of all, the subscriber entity 200 might not support a CRL functionality as this is optional to support for some subscriber entities 200, such as an eUICC. Secondly, even if the subscriber entity 200 supports a CRL functionality, this comes at the cost of a storage and processing burden.

Further, in some aspects, the subscriber entity 200 might not be assumed to have its own source of current time which it can trust. In such scenarios, verifying if a certificate is still valid based on its timestamp could be an issue for the subscriber entity 200 and hence might not provide real-time guarantee of the validity of a certificate.

The embodiments disclosed herein thus relate to mechanisms for certificate revocation check during a subscription related procedure for a subscriber entity 200 and facilitating certificate revocation check during a subscription related procedure for a subscriber entity 200. In order to obtain such mechanisms there is provided a subscriber entity 200, a method performed by the subscriber entity 200, a computer program product comprising code, for example in the form of a computer program, that when run on processing circuitry of the subscriber entity 200, causes the subscriber entity 200 to perform the method. In order to obtain such mechanisms there is further provided a subscription management entity 300, a method performed by the subscription management entity 300, and a computer program product comprising code, for example in the form of a computer program, that when run on processing circuitry of the subscription management entity 300, causes the subscription management entity 300 to perform the method.

Figure 2:
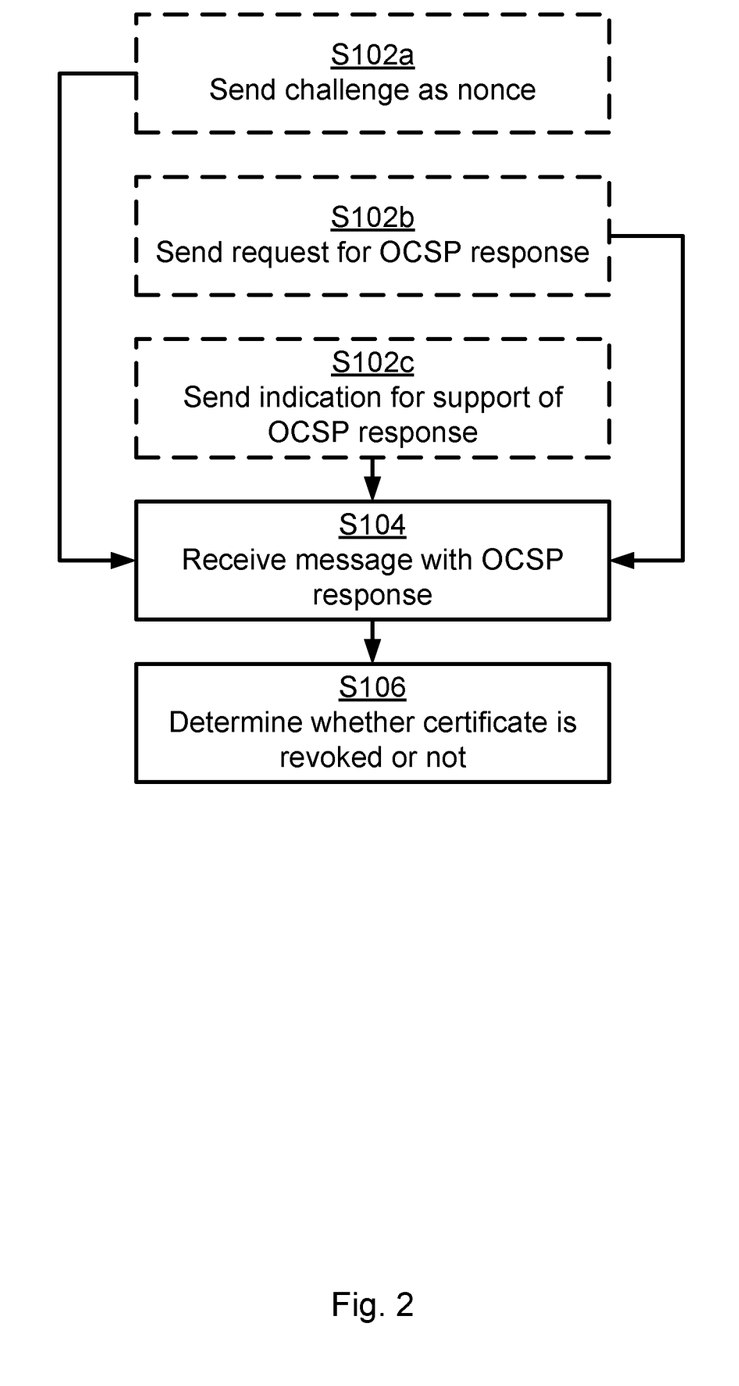
FIGS. 2 and 3 are flowcharts of methods according to embodiments.

Reference is now made to FIG. 2 illustrating a method for certificate revocation check during a subscription related procedure for a subscriber entity 200 as performed by the subscriber entity 200 according to an embodiment.

S104: The subscriber entity 200 receives a message from a subscription management entity 300 during the subscription related procedure for the subscriber entity 200. The message comprises a certificate and an OCSP response for the certificate. The OCSP response indicates a revocation state of the certificate.

S106: The subscriber entity 200 determines whether the certificate has been revoked or not by checking the revocation state as indicated in the OCSP response.

Embodiments relating to further details of certificate revocation check during a subscription related procedure for a subscriber entity 200 as performed by the subscriber entity 200 will now be disclosed.

The message might comprise other information and/or data than the OCSP response and hence the OCSP response might be piggybacked on an existing message sent from the subscription management entity 300 towards the subscriber entity 200 during the subscription related procedure. That is, the message comprising the OCSP response is typically not a standalone message.

In some aspects, the subscription related procedure is performed after a Transport Layer Security (TLS)/Hypertext Transfer Protocol Secure (HTTPS) connection has been set up. That is, according to an embodiment, the OCSP response is received by the subscriber entity 200 after TLS connection set up for the subscription related procedure for the subscriber entity 200 has been completed.

There may be different types of certificates as used during different types of subscription related procedures.

According to a first embodiment, the certificate is an authentication certificate and is used for authentication between the subscriber entity 200 and the subscription management entity 300. Such a certificate might be used during an RSP procedure. That is, according to some embodiments, the message is received as part of remote subscription provisioning of the subscriber entity 200. The message might thus be received as part of a message exchange when using the common authentication protocol as part of a common authentication process.

According to a first embodiment, the certificate is a binding profile package certificate and is used for binding a subscription profile to the subscriber entity 200. Such a certificate might be used during a download and installation procedure. That is, according to some embodiments, the message is received as part of subscription profile download and installation to the subscriber entity 200.

There could be different actions performed by the subscriber entity 200 that triggers the message as received in S104 to be sent by the subscription management entity 300.

In some aspects, the OCSP response is received in response to the subscriber entity 200 having sent a challenge towards the subscription management entity 300. That is, according to an embodiment, the subscriber entity 200 is configured to perform (optional) step S102a:

S102a: The subscriber entity 200 sends a nonce as a challenge towards subscription management entity 300. The OCSP response is bound to the nonce.

In some aspects, the challenge is sent during an authentication procedure. That is, according to an embodiment, the challenge is sent, and the OCSP response is received, as part of authentication between the subscriber entity 200 and the subscription management entity 300. A nonce used in the authentication procedure can also be used for the OCSP response.

In some aspects, the OCSP response is received in response to the subscriber entity 200 having sent an explicit request for the OCSP response towards the subscription management entity 300. That is, according to an embodiment, the subscriber entity 200 is configured to perform (optional) step S102*b*:

S102*b*: The subscriber entity 200 sends a request to the subscription management entity 300 for the OCSP response. The OCSP response is then received in response thereto (i.e., in response to the request having been sent).

In some aspects, the OCSP response is received in response to the subscriber entity 200 having sent an implicit request for the OCSP response towards the subscription management entity 300. In particular, according to an embodiment, the subscriber entity 200 is configured to perform (optional) step S102*c*:

S102*c*: The subscriber entity 200 sends an indication to the subscription management entity 300 that the subscriber entity 200 supports reception of the OCSP response. The OCSP response is then received in response thereto (i.e., in response to the indication having been sent).

The indication might imply that it will be mandatory for the subscription management entity 300 to send an OCSP response towards the subscriber entity 200.

There could be different ways in which the indication is sent in S102*c*. For example, the indication might be sent by a parameter being added by the subscriber entity 200 in the initial messages exchanged between the subscriber entity 200 and the subscription management entity 300. For example, the indication might be defined by device information sent from the subscriber entity 200 towards the subscription management entity 300 during the download and installation process and where the subscription management entity 300 interprets this device information as that the subscriber entity 200 supports OCSP messages, and thus is enabled to correctly interpret the OCSP response.

There could be different ways for the subscriber entity 200 to act once having checked the revocation state as indicated in the OCSP response and thus determined whether the certificate has been revoked or not.

In general terms, the subscription related procedure is aborted if it cannot be verified that the certificate has not been revoked. Particularly, according to an embodiment, the subscription related procedure for the subscriber entity 200 is continued only when the certificate is determined to be not revoked. The subscription related procedure for the subscriber entity 200 is otherwise aborted.

Figure 3:
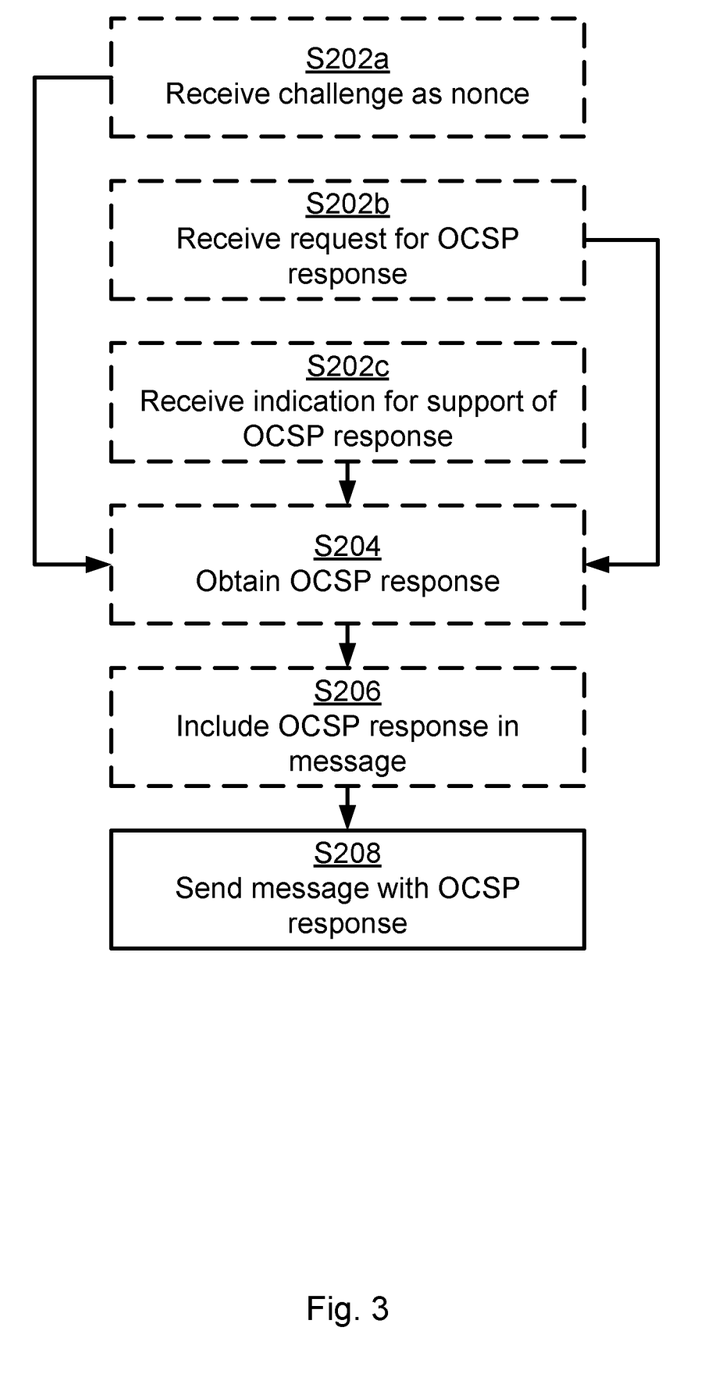

Reference is now made to FIG. 3 illustrating a method for facilitating certificate revocation check during a subscription related procedure for a subscriber entity 200 as performed by the subscription management entity 300 according to an embodiment.

S208: The subscription management entity 300 sends a message towards the subscriber entity 200 during the subscription related procedure for the subscriber entity 200. The message comprises a certificate and an OCSP response for the certificate. The OCSP response indicates a revocation state of the certificate.

Embodiments relating to further details of facilitating certificate revocation check during a subscription related procedure for a subscriber entity 200 as performed by the subscription management entity 300 will now be disclosed.

As disclosed above, the message might comprise other information and/or data than the OCSP response and hence the OCSP response might be piggybacked on an existing message sent from the subscription management entity 300 towards the subscriber entity 200 during the subscription related procedure.

As disclosed above, there could be different actions performed by the subscriber entity 200 that triggers the message as received in S104 by the subscriber entity 200 to be sent by the subscription management entity 300 in S208.

As further disclosed above, in some aspects, the subscriber entity 200 sends a challenge towards the subscription management entity 300. That is, according to an to embodiment, the subscription management entity 300 is configured to perform (optional) step S202*a*:

S202*a*: The subscription management entity 300 receives a nonce as a challenge from the subscriber entity 200. The OCSP response is then given as a function of the challenge.

As further disclosed above, in some aspects, the subscriber entity 200 sends an explicit request for the OCSP response towards the subscription management entity 300. That is, according to an embodiment, the subscription management entity 300 is configured to perform (optional) step S202*b*:

S202*b*: The subscription management entity 300 receives a request from the subscriber entity 200 for the OCSP response. The OCSP response is then sent in response thereto (i.e., in response to the request having been received).

As further disclosed above, in some aspects, the subscriber entity 200 sends an implicit request for the OCSP response towards the subscription management entity 300. In particular, according to an embodiment, the subscription management entity 300 is configured to perform (optional) step S202*b*:

S202*c*: The subscription management entity 300 receives an indication from the subscriber entity 200 that the subscriber entity 200 supports reception of the OCSP response. The OCSP response is then sent in response thereto (i.e., in response to the indication having been received).

The indication might imply that it will be mandatory for the subscription management entity 300 to send an OCSP response towards the subscriber entity 200.

In some aspects the OCSP response is generated outside the subscription management entity 300 and the subscription management entity 300 therefore needs to obtain the OCSP response before forwarding the same towards the subscriber entity 200. That is, according to an embodiment, the subscription management entity 300 is configured to perform (optional) steps S204 and S206:

S204: The subscription management entity 300 obtains the OCSP response.

S206: The subscription management entity 300 includes the OCSP response in the message.

The subscription management entity 300 might in S204 obtain the OCSP response e.g. from an OCSP responder.

Steps S204 and S206 are performed before step S208. If performed together with any of S102*a*, S102*b*, S102*c*, then S204 and S206 are performed after any of S102*a*, S102*b*, S102*c*.

Further, in some embodiments the OCSP response is obtained before authentication (for example before the current subscription related procedure starts between the subscriber entity 200 and the subscription management entity 300) between the subscriber entity 200 and the subscription management entity 300. However, in other embodiments, the OCSP response is obtained as part of authentication between the subscriber entity 200 and the subscription management entity 300. The latter could guarantee freshness of the OCSP response.

Embodiments, aspects, and examples applicable for both the methods performed by the subscriber entity 200 and the methods performed by the subscription management entity 300 will now be disclosed.

There could be different types of certificates that are included in the message received in S104 and transmitted in S208. In some examples, the certificate is any of the certificate in the list comprising: CERT.DPauth.ECDSA, CERT.DPpb.ECDSA, and CERT.DSauth.ECDSA.

In some examples, the OCSP response represents a digitally signed response on the revocation status of the certificate.

In some examples, the certificate is signed and issued by a GSMA CI.

Further embodiments, aspects, and examples applicable for both the methods performed by the subscriber entity 200 and the methods performed by the subscription management entity 300 will now be disclosed.

Using an OCSP response as received from the subscription management entity 300, the subscriber entity 200 can determine the revocation status of the identified certificate. In short, a client sends an OCSP request to a responder for a certificate to and the responder sends a digitally signed response on the revocation status of the certificate. This signed response might be used by a TLS server, such as the subscription management entity 300, to be sent during the TLS handshake with a TLS client, such as the subscriber entity 200, so that the subscriber entity 200 can verify the revocation status of the certificate. In this respect, the TLS client can use the "Certificate Status Request" extension of the TLS protocol so that in response the TLS server can send the OCSP response in the extended server hello message of the TLS handshake process.

The embodiments disclosed herein make use of the OCSP response outside the context of the TLS handshake procedure and instead, for example, during the common authentication mechanism performed between the eUICC and the SM-DP+ or between the eUICC and the SM-DS. During the TLS handshake the SM-DP+ and the SM-DS use TLS certificates and not authentication certificates. Hence, the revocation status of the authentication certificates is not verified during a TLS handshake procedure.

The common authentication mechanism is described in section 3.1.2 of the aforementioned document. In this mechanism at step 9 the subscription management entity 300 (either SM-DP or SM-DS) sends some data, signature and the CERT.XXauth.ECDSA certificate (where XX stands for either DP or DS) towards the subscriber entity 200 as represented by the eUICC. To validate the revocation status of the CERT.XXauth.ECDSA certificate the subscriber entity 200 has to have the CRLs already stored and updated in the subscriber entity 200 or obtain an updated CRL during this process or it has to initiate a query to the OCSP responder.

According to the herein disclosed embodiments, the subscription management entity 300 has access to an OCSP response for the CERT.XXauth.ECDSA certificate before or during the common authentication process and sends this OCSP response (as a certStatus parameter) as an additional data during step 9 towards the LPAd. After the LPAd performs its regular operation in step to, the LPAd now calls the ES10b.AuthenticateServer function with an additional parameter. This additional parameter is what the subscription management entity 300 sent as an OCSP response. In some aspects, this AuthenticateServer function is the actual function where a certificate for authentication gets verified. This function can use the OCSP response and therefrom check the status of the revocation of the CERT.XXauth-.ECDSA certificate. Based on this data no additional query needs to be made by the subscriber entity 200 and no CRL list needs to be maintained in the subscriber entity 200. This not only simplifies the design of the subscriber entity 200 but also makes the overall certificate validation process to be more efficient as it removes the burden of maintaining or gaining certification revocation information from the subscriber entity side. This also makes the subscriber entity 200 to operate faster as there is no need for the subscriber entity 200 to download the CRL or run an OCSP exchange during the authentication phase. For constrained devices this can be a significant improvement.

The same procedure (i.e., that the subscription management entity 300 (either SM-DP or SM-DS) sends some data, signature and the CERT.XXauth.ECDSA certificate towards the subscriber entity 200 as represented by the eUICC and that the OCSP response is used by the subscriber entity 200 to check the status of the revocation of the CERT.XXauth-.ECDSA certificate) can be performed also for other certificates than the CERT.XXauth.ECDSA certificate.

For example, the same procedure can be used for the CERT.DPpb.ECDSA certificate that is used to verify the SM-DP+ signature in a bound profile package. The profile download and installation process is described in section 3.1.3 of the aforementioned document. In step 6 of this process, some data, signature and the CERT.DPpb.ECDSA certificate is sent from the SM-DP+ to the LPAd. After receiving this, the LPA does some checking and processing. The actual verification of the CERT.DPpb.ECDSA certificate is performed in a "Sub-procedure Profile Download and Installation-Download Confirmation" sub process that is described in section 3.1.3.2 of the aforementioned document. The actual verification of the CERT.DPpb.ECDSA certificate is performed in Step 2 of this sub-process (which also includes the revocation status verification).

According to the herein disclosed embodiments, in step 6 of the process in section 3.1.3 of the aforementioned document, the subscription management entity 300 sends an OCSP response (as a certStatus parameter) of the CERT.DPpb.ECDSA certificate towards the LPAd. When the LPAd calls the ES10b.PrepareDownload function of the eUICC, it passes along the OCSP response to that function as an additional parameter. Now, using this additional data (i.e., the certStatus parameter), a PrepareDownload function in the subscriber entity 200 can verify the revocation status of the CERT.DPpb.ECDSA certificate without any additional CRL or any call to an external OCSP responder by checking the status of the revocation of the CERT.DPpb.ECDSA certificate.

Figure 4:
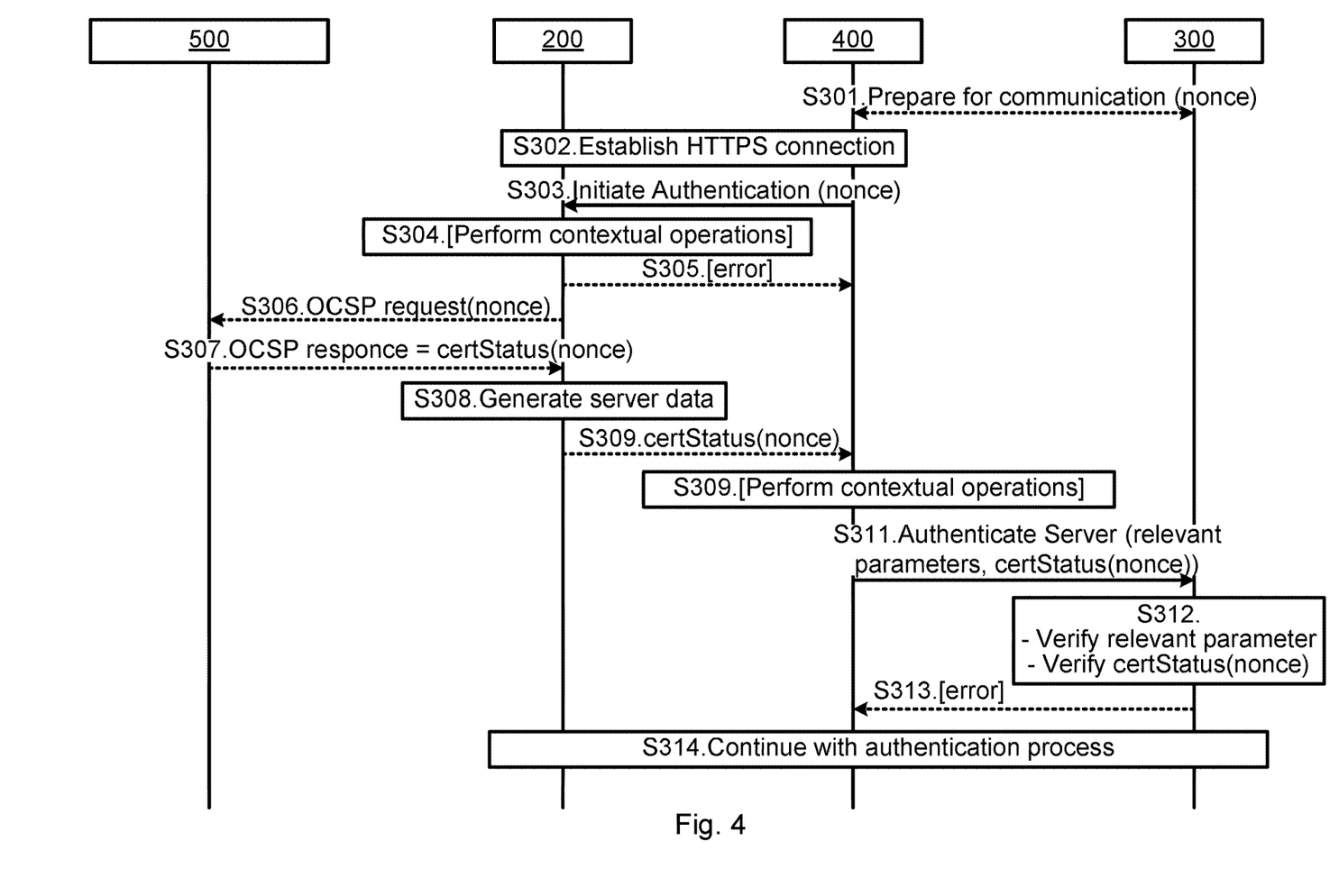
FIGS. 4 and 5 are signalling diagrams according to embodiments.

A first particular embodiment for certificate revocation check during a subscription related procedure for the subscriber entity 200, where the subscription related procedure pertains to common authentication between the subscriber entity 200 and the subscription management entity 300, based on at least some of the above disclosed embodiments will now be disclosed in detail with reference to the signalling diagram of FIG. 4.

S301: The LPAd 400 sends a message to the subscriber entity 200 for preparation of communication with the subscription management entity 300.

S302: A HTTPS connection is established between the subscription management entity 300 and the LPAd 400.

S303: The LPAd 400 initiates authentication with the subscription management entity 300 by calling the authentication initiation function including several pieces of data from the subscriber entity 200, which might comprise a nonce, towards the subscription management entity 300.

S304: The subscription management entity 300 performs contextual operations. This includes verifying the address of subscription management entity 300 sent from the subscriber entity 200, checking the eUICC information, etc.

S305: The subscription management entity 300 responds with an error message to the LPAd 400 if the contextual operations in S304 are not successful, and the procedure is aborted If the subscription management entity 300 not already has obtained an OCSP response for its certificate whose revocation status is to be checked during the common authentication procedure, or the already obtained OCSP response for the particular certificate whose revocation status is to be checked has expired (or an updated response bound to this particular exchange/nonce is required), steps S306 and S307 are performed. Otherwise these steps are skipped.

S306: The subscription management entity 300 requests an OCSP response, which might comprise a nonce, for its certificate whose revocation status is to be checked from an OCSP responder 500.

S307: The subscription management entity 300 obtains the OCSP response, which might comprise a nonce, from the OCSP responder 500. The OCSP response indicates a revocation state of the certificate.

S308: The subscription management entity 300 generates server data. This includes generating a transaction ID, generating server challenge, selecting one CI public key, generating signature, etc.

S309: The subscription management entity 300 sends data generated in S308 as well as the OCSP response, which might comprise a nonce, towards the subscriber entity 200.

S310: The LPAd 400 performs contextual operations. This includes verifying the address of the subscription management entity 300 as returned by the subscription management entity 300 matches the address that the LPAd 400 has provided in step S303, generating a data structure to be given to the eUICC, etc.

S311: The LPAd 400 forwards the OCSP response, which might comprise a nonce, to the subscriber entity 200.

S312: The subscriber entity 200 determines whether the certificate has been revoked or not by checking the revocation state as indicated in the OCSP response.

S313: The subscriber entity 200 responds with an error message to the LPAd 400 if in S312 determined that the certificate has been revoked, and the procedure is aborted.

S314: The authentication process between the subscriber entity 200 and the subscription management entity 300 is continued upon the subscriber entity 200 having verified that the certificate as checked in S312 has not been revoked.

In some aspects the subscriber entity 200 does not have a reliable time source. Hence, replay attack using an outdated OCSP response might then be possible by a rogue subscription management entity 300. One way to defend against this replay attack is by modifying the common mutual authentication process described in section 3.1.2 of the aforementioned document. As described in that section, during step 3 the eUICC generates a new random eUICC challenge. This is done by calling the ES10b.GetEUICCChallenge function. This function ensures that only one session between one subscription management entity 300 and the issuer security domain-root (ISD-R) of the eUICC is open at any point and also to generate a new session context with fresh random challenge. This eUICC challenge is sent to the LPAd and then the TLS handshake between the LPAd and the subscription management entity 300 is performed. Then the eUICC challenge is sent to the subscription management entity 300 by the LPAd. This eUICC challenge is used later on for server verification. According to embodiments disclosed herein, this eUICC challenge (or part of it) can be used as a nonce to trigger the generation of a fresh OCSP response that is to be transmitted by the subscription management entity 300. This will ensure the freshness of the OCSP response to the eUICC and no replay attack is possible in this way.

Including the above mentioned eUICC challenge (or part of it) as a nonce in the OCSP request and response ensures the freshness of the revocation status of the certificates to the eUICC. Furthermore, the same eUICC challenge can be used as nonce to get the freshness of both the SM-DP+ certificates (CERT.DPauth.ECDSA and CERT.DPpb.ECDSA) as there will be only one session allowed between the SM-DP+ and the eUICC during the profile download and installation process.

Figure 5:
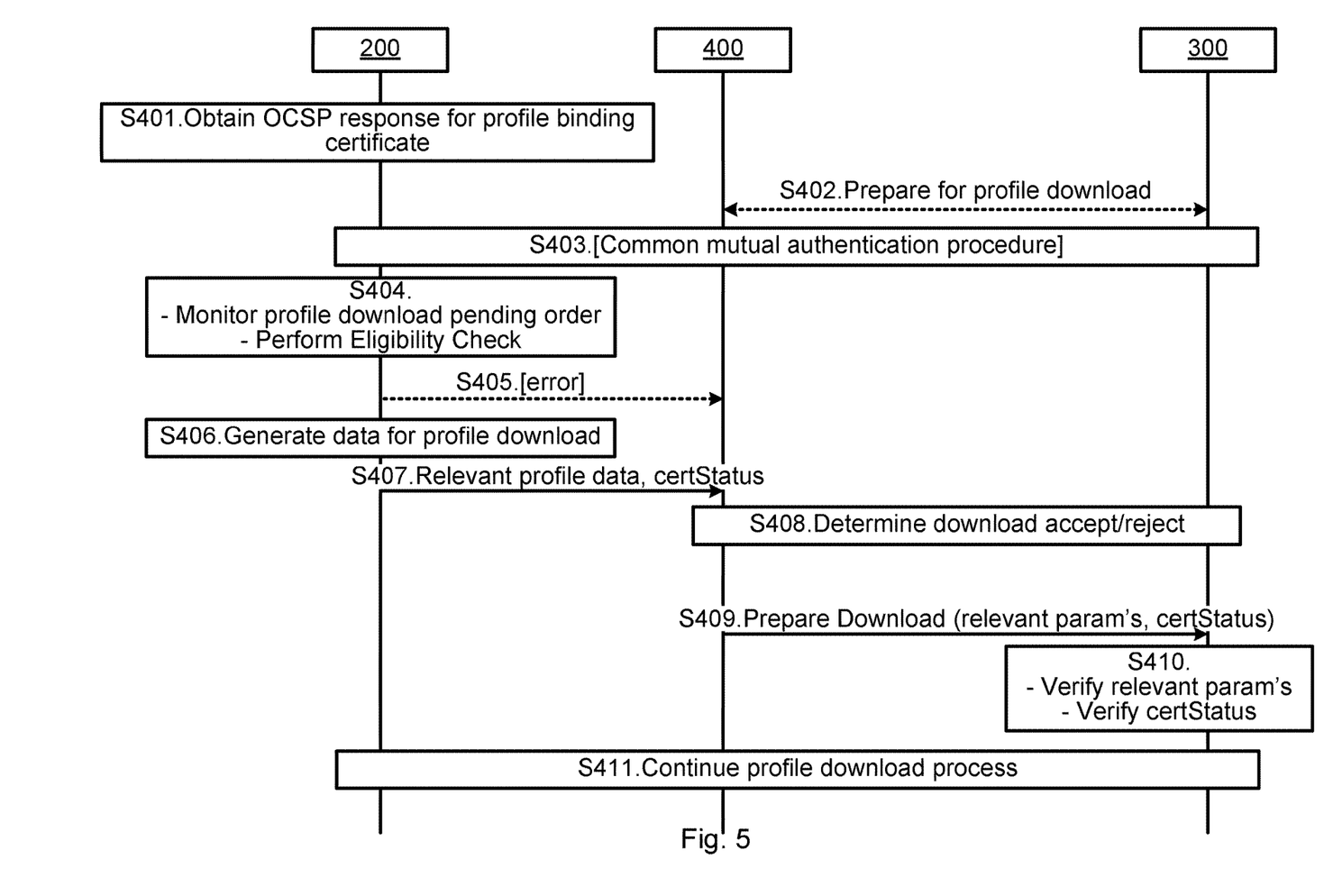

A second particular embodiment for certificate revocation check during a subscription related procedure for the subscriber entity 200, where the subscription related procedure pertains to download and installation, based on at least some of the above disclosed embodiments will now be disclosed in detail with reference to the signalling diagram of FIG. 5.

S401: The subscription management entity 300 obtains an OCSP response. The OCSP response indicates a revocation state of the certificate whose revocation status is to be checked during the download and installation procedure.

S402: The LPAd 400 sends a message to the subscriber entity 200 for preparation of profile download from the subscription management entity 300.

S403: A common mutual authentication procedure is performed between the subscriber entity 200 and the subscription management entity 300, for examples as in FIG. 4.

S404: The subscription management entity 300 monitors if there are any pending orders for profile download and performs an eligibility check based on the device information.

S405: The subscription management entity 300 responds with an error message to the LPAd 400 if there is no pending order for the subscriber entity 200 or if the eligibility check in S404 fails, and the procedure is aborted.

S406: The subscription management entity 300 generates data for the profile download. This includes generating profile metadata, generating signed data, etc.

S407: The subscription management entity 300 sends the data for the profile download to the LPAd 400 together with the OCSP response which might comprise a nonce.

S408: The LPAd 400 determines, from the data for the profile download, whether to accept or reject the profile download.

S409: If decided to accept the profile download, the LPAd 400 sends a prepare download message to the subscriber entity 200, including the data for the profile download and the OCSP response, which might comprise a nonce.

S410: The subscriber entity 200 verifies the data for the profile download and determines whether the certificate has been revoked or not by checking the revocation state as indicated in the OCSP response.

S411: The profile download process for the subscriber entity 200 is continued with the subscription management entity 300 upon the subscriber entity 200 having verified that the certificate as checked in S411 has not been revoked.

Figure 6:
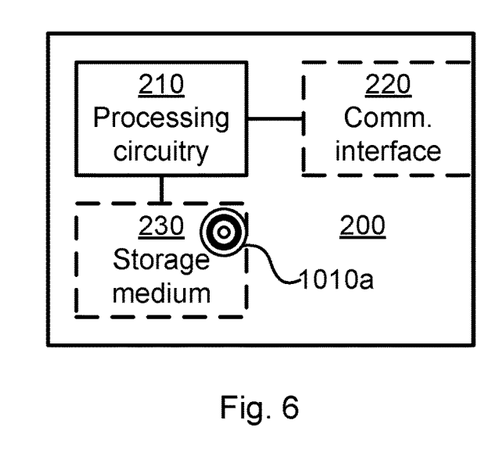
FIG. 6 is a schematic diagram showing functional units of a subscriber entity according to an embodiment.

FIG. 6 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, as disclosed above. For example, the storage medium 230 may store the set of operations, and the processing circuitry 210 may be configured to retrieve the set of operations from the storage medium 230 to cause the subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications with other entities, devices, nodes, and functions, of the communication network 100. As such the communications interface 220 may comprise one or more transmitters and receivers, comprising analogue and digital components.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 7:
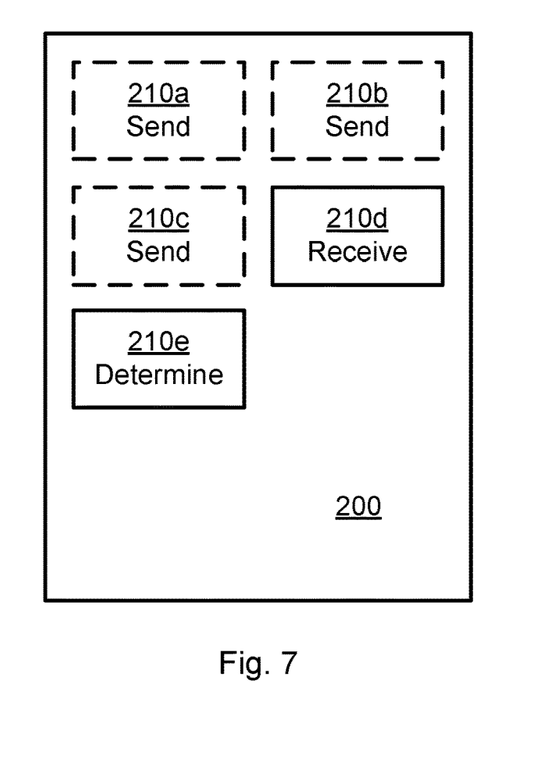
FIG. 7 is a schematic diagram showing functional modules of a subscriber entity according to an embodiment.

FIG. 7 schematically illustrates, in terms of a number of functional modules, the components of a subscriber entity 200 according to an embodiment. The subscriber entity 200 of FIG. 7 comprises a number of functional modules; a receive module 210d configured to perform step S104, and a determine module 210e configured to perform step S106. The subscriber entity 200 of FIG. 7 may further comprise a number of optional functional modules, such as any of a send module 210a configured to perform step S102a, a send module 210b configured to perform step S102b, and a send module 210c configured to perform step S102c. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the subscriber entity 200 as disclosed herein.

Examples of subscriber entities 200 have been disclosed above with reference to FIG. 1.

Figure 8:
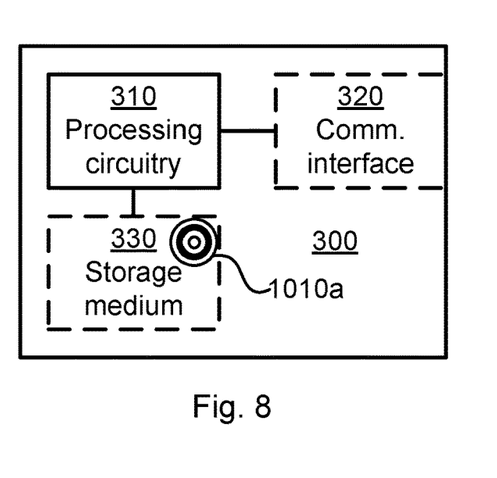
FIG. 8 is a schematic diagram showing functional units of a subscription management entity according to an embodiment.

FIG. 8 schematically illustrates, in terms of a number of functional units, the components of a subscription management entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscription management entity 300 to perform a set of operations, or steps, as disclosed above. For example, the storage medium 330 may store the set of operations, and the processing circuitry 310 may be configured to retrieve the set of operations from the storage medium 330 to cause the subscription management entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscription management entity 300 may further comprise a communications interface 320 for communications with other entities, devices, nodes, and functions, of the communication network 100. As such the communications interface 320 may comprise one or more transmitters and receivers, comprising analogue and digital components.

The processing circuitry 310 controls the general operation of the subscription management entity 300 e.g. by sending data and control signals to the communications interface 320 and the storage medium 330, by receiving data and reports from the communications interface 320, and by retrieving data and instructions from the storage medium 330. Other components, as well as the related functionality, of the subscription management entity 300 are omitted in order not to obscure the concepts presented herein.

Figure 9:
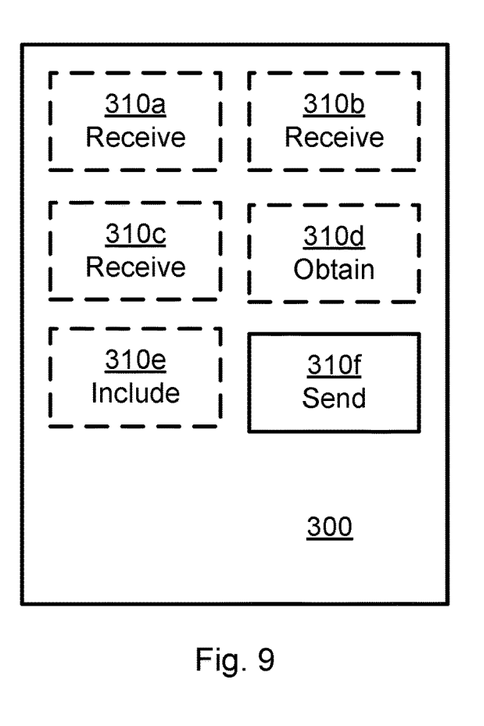
FIG. 9 is a schematic diagram showing functional modules of a subscription management entity according to an embodiment.

FIG. 9 schematically illustrates, in terms of a number of functional modules, the components of a subscription management entity 300 according to an embodiment. The subscription management entity 300 of FIG. 9 comprises a send module 310f configured to perform step S208. The subscription management entity 300 of FIG. 9 may further comprise a number of optional functional modules, such as any of a receive module 310a configured to perform step S202a, a receive module 310b configured to perform step S202b, a receive module 310c configured to perform step S202c, an obtain module 310d configured to perform step S204, and an include module 310e configured to perform step S206. In general terms, each functional module 310a-310f may be implemented in hardware or in software. Preferably, one or more or all functional modules 310a-310f may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310f and to execute these instructions, thereby performing any steps of the subscription management entity 300 as disclosed herein.

Examples of subscription management entities 300 have been disclosed above with reference to FIG. 1.

The subscription management entity 300 may be provided as a standalone device or as a part of at least one further device. For example, the subscription management entity 300 may be provided in a node of the radio access network 110 or in a node of the core network 120, or even in a node of the service network 130. Alternatively, functionality of the subscription management entity 300 may be distributed between at least two devices, or nodes. These at least two nodes, or devices, may either be part of the same network part (such as the radio access network 110 or the core network 120 or the service network 130) or may be spread between at least two such network parts. In general terms, instructions that are required to be performed in real time may be performed in a device, or node, operatively closer to the cell than instructions that are not required to be performed in real time.

Thus, a first portion of the instructions performed by the subscription management entity 300 may be executed in a first device, and a second portion of the instructions performed by the subscription management entity 300 may be executed in a second device; the herein disclosed embodiments are not limited to any particular number of devices on which the instructions performed by the subscription management entity 300 may be executed. Hence, the methods according to the herein disclosed embodiments are suitable to be performed by a subscription management entity 300 residing in a cloud computational environment. Therefore, although a single processing circuitry 310 is illustrated in FIG. 8 the processing circuitry 310 may be distributed among a plurality of devices, or nodes. The same applies to the functional modules 310*a*-310*f* of FIG. 9 and the computer program 1020*b* of FIG. 10.

Figure 10:
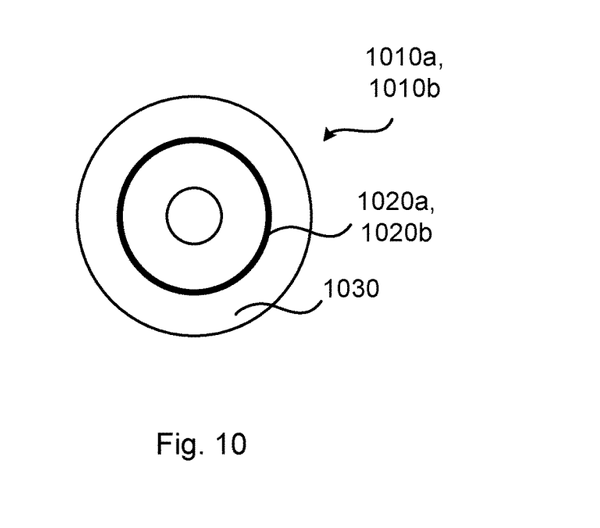
FIG. 10 shows one example of a computer program product comprising computer readable means according to an embodiment.

FIG. 10 shows one example of a computer program product 1010*a*, 1010*b* comprising computer readable means 1030. On this computer readable means 1030, a computer program 1020*a* can be stored, which computer program 1020*a* can cause the processing circuitry 210 and thereto operatively coupled entities and devices, such as the communications interface 220 and the storage medium 230, to execute methods according to embodiments described herein. The computer program 1020*a* and/or computer program product 1010*a* may thus provide means for performing any steps of the subscriber entity 200 as herein disclosed. On this computer readable means 1030, a computer program 1020*b* can be stored, which computer program 1020*b* can cause the processing circuitry 310 and thereto operatively coupled entities and devices, such as the communications interface 320 and the storage medium 330, to execute methods according to embodiments described herein. The computer program 1020*b* and/or computer program product 1010*b* may thus provide means for performing any steps of the subscription management entity 300 as herein disclosed.

In the example of FIG. 10, the computer program product 1010*a*, 1010*b* is illustrated as an optical disc, such as a CD (compact disc) or a DVD (digital versatile disc) or a Blu-Ray disc. The computer program product 1010*a*, 1010*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020*a*, 1020*b* is here schematically shown as a track on the depicted optical disk, the computer program 1020*a*, 1020*b* can be stored in any way which is suitable for the computer program product 1010*a*, 1010*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for certificate revocation check during a subscription related procedure for a subscriber entity, the method being performed by the subscriber entity, the method comprising:
sending, by the subscriber entity, a nonce as a challenge towards a subscription management entity separately located at a different device from the subscriber entity to trigger generation of a fresh online certificate status protocol (OCSP) response that is to be transmitted by the subscription management entity to the subscriber entity;
receiving, by the subscriber entity, a message sent from the subscription management entity during remote subscriber identity module (SIM) provisioning for the subscriber entity, the message comprising a certificate and the OCSP response for the certificate, the OCSP response being bound to the nonce and indicating a revocation state of the certificate; and
determining, by the subscriber entity, whether the certificate has been revoked or not by checking the revocation state as indicated in the OCSP response.

2. The method according to claim 1, wherein the certificate is an authentication certificate and is used for authentication between the subscriber entity and the subscription management entity.

3. The method according to claim 1, wherein the message is received as part of remote subscription provisioning of the subscriber entity.

4. The method according to claim 1, wherein the certificate is a binding profile package certificate and is used for binding a subscription profile to the subscriber entity.

5. The method according to claim 1, wherein the message is received as part of subscription profile download and installation to the subscriber entity.

6. The method according to claim 1, wherein the challenge is sent and wherein the OCSP response is received as part of authentication between the subscriber entity and the subscription management entity.

7. The method according to claim 1, further comprising:
sending a request to the subscription management entity for the OCSP response, and wherein the OCSP response is received in response thereto.

8. The method according to claim 1, wherein the subscription related procedure for the subscriber entity is continued only when the certificate is determined to be not revoked, and the subscription related procedure for the subscriber entity otherwise is aborted.

9. The method according to claim 1, wherein the OCSP response is received after Transport Layer Security (TLS) connection set up for the subscription related procedure for the subscriber entity has been completed.

10. A method for facilitating certificate revocation check during a subscription related procedure for a subscriber entity, the method being performed by a subscription management entity, the method comprising:
receiving at the subscription management entity a nonce, sent from the subscriber entity separately located at a different device from the subscription management entity, as a challenge to trigger generation of a fresh online certificate status protocol (OCSP) response that is to be transmitted by the subscription management entity to the subscriber entity;

sending, from the subscription management entity, a message towards the subscriber entity during remote subscriber identity module (SIM) provisioning for the subscriber entity, the message comprising a certificate and the OCSP response for the certificate, the OCSP response being bound to the nonce and indicating a revocation state of the certificate such that the subscriber entity can determine whether the certificate has been revoked or not by checking the revocation state as indicated in the received OCSP response.

11. The method according to claim 10, further comprising:
obtaining the OCSP response; and
including the OCSP response in the message.

12. The method according to claim 11, wherein the OCSP response is obtained before authentication between the subscriber entity and the subscription management entity.

13. The method according to claim 10, further comprising:
receiving a request from the subscriber entity for the OCSP response, and wherein the OCSP response is sent in response thereto.

14. The method according to claim 10, further comprising:
receiving an indication from the subscriber entity that the subscriber entity supports reception of the OCSP response, and wherein the OCSP response is sent in response thereto.

15. The method according to claim 10, wherein the OCSP response represents a digitally signed response on the revocation state of the certificate.

16. The method according to claim 10, wherein the certificate is signed and issued by a GSMA CI.

17. The method according to claim 10, wherein the subscriber entity is an embedded universal integrated circuit card (eUICC).

18. The method according to claim 10, wherein the subscription management entity is a Subscription Manager Data Preparation (SM-DP) entity, an enhanced Subscription Manager Data Preparation (SM-DP+) entity, a Subscription Manager Discovery Server (SM-DS), or a Subscription Manager Secure Routing (SM-SR) entity.

19. A subscriber entity for certificate revocation check during a subscription related procedure for the subscriber entity, the subscriber entity comprising:
processing circuitry configured to cause the subscriber entity to:
send, by the subscriber entity, a nonce as a challenge towards a subscription management entity separately located at a different device from the subscriber entity to trigger generation of a fresh online certificate status protocol (OCSP) response that is to be transmitted by the subscription management entity to the subscriber entity;
receive, by the subscriber entity, a message sent from the subscription management entity during remote subscriber identity module (SIM) provisioning for the subscriber entity, the message comprising a certificate and the OCSP response for the certificate, the OCSP response being bound to the nonce and indicating a revocation state of the certificate; and
determine, by the subscriber entity, whether the certificate has been revoked or not by checking the revocation state as indicated in the OCSP response.

\* \* \* \* \*